United States Patent [19]

Helberg

[11] Patent Number: 5,986,222
[45] Date of Patent: Nov. 16, 1999

[54] FISH SCALE HAVING A PIVOTAL DISPLAY ASSEMBLY

[75] Inventor: Gary L. Helberg, Oklahoma City, Okla.

[73] Assignee: Zorix International, Oklahoma City, Okla.

[21] Appl. No.: 09/150,809

[22] Filed: Sep. 10, 1998

[51] Int. Cl.[6] .......................... G01G 19/56; G01G 21/28; G01G 21/22

[52] U.S. Cl. .......................... 177/148; 177/173; 177/238; 177/263

[58] Field of Search ..................... 177/126, 127, 177/128, 131, 148, 149, 173, 180, 238, 177, 245, 263, 239, 253, 262, 240, 241, 242, 243, 260, 244; D10/93

[56] References Cited

U.S. PATENT DOCUMENTS

| | | | |
|---|---|---|---|
| 82,842 | 10/1868 | Hurd | 177/131 |
| D. 335,635 | 5/1993 | Robbins | D10/89 |
| 531,954 | 1/1895 | Langer | 177/131 |
| 609,644 | 8/1898 | West | 177/131 |
| 619,422 | 2/1899 | Kohn | 177/131 |
| 735,003 | 7/1903 | Ward | 177/148 |
| 817,974 | 4/1906 | Heizer | 177/149 |
| 1,105,618 | 8/1914 | Christianson | 177/149 |
| 1,152,824 | 9/1915 | Leary | 177/148 |
| 1,221,673 | 4/1917 | Canty | 177/149 |
| 1,255,269 | 2/1918 | Zinkieweiz | 177/148 |
| 1,518,205 | 12/1924 | Kountz | 177/148 |
| 1,750,193 | 3/1930 | Reynolds | 177/148 |
| 2,129,469 | 9/1938 | Hedges | 177/148 |
| 2,458,811 | 1/1949 | Koscielski | 177/245 |
| 2,518,973 | 8/1950 | Atherton | 177/126 |
| 2,586,245 | 2/1952 | McRae | 177/148 |
| 2,603,474 | 7/1952 | Mandolf et al. | 177/148 |
| 2,633,351 | 3/1953 | Fowle | 177/148 |
| 2,678,817 | 5/1954 | Mitton | 177/245 |
| 2,750,184 | 6/1956 | Warndahl | 177/245 |
| 2,805,055 | 9/1957 | Swanson | 177/239 |
| 2,805,850 | 9/1957 | Robinson | 177/126 |
| 3,077,237 | 2/1963 | Nakayama | 177/245 |
| 3,082,561 | 3/1963 | Convey et al. | 177/148 |
| 3,223,189 | 12/1965 | Robbins | 177/149 |
| 3,229,780 | 1/1966 | Hanssen | 177/238 |
| 4,364,442 | 12/1982 | Flickinger | 177/177 |
| 4,765,420 | 8/1988 | Mengo | 177/149 |
| 4,785,897 | 11/1988 | Keinert, Jr. | 177/148 |
| 4,802,540 | 2/1989 | Grabovac et al. | 177/238 |
| 4,936,399 | 6/1990 | Christman et al. | 177/149 |
| 4,979,579 | 12/1990 | Dardat et al. | 177/180 |
| 5,203,419 | 4/1993 | Douglas | 177/244 |
| 5,396,035 | 3/1995 | Studanski | 177/239 |
| 5,576,521 | 11/1996 | Dubach | 177/148 |
| 5,637,838 | 6/1997 | Arey et al. | 177/148 |
| 5,747,744 | 5/1998 | Kraft et al. | 177/262 |
| 5,841,076 | 11/1998 | Schwartz et al. | 177/25.13 |
| 5,854,447 | 12/1998 | Greenwood et al. | 177/148 |

*Primary Examiner*—Randy W. Gibson
*Attorney, Agent, or Firm*—Dunlap, Codding & Rogers

[57] ABSTRACT

A hand-held electronic scale for weighing an object is provided. The scale includes display assembly pivotally connected to a handle assembly for viewing the weight of an object at an optimum viewing angle relative to the eyes of the individual. The object to be weighed being supported on a support member having a hook shaped first end adapted to transfer the force of the object supported thereon to a force sensor contained within the handle assembly and transmitting a value to a micro-controller for generating an alpha-numeric readout representing the weight of the object for viewing on an electronic display contained within a display assembly.

7 Claims, 2 Drawing Sheets

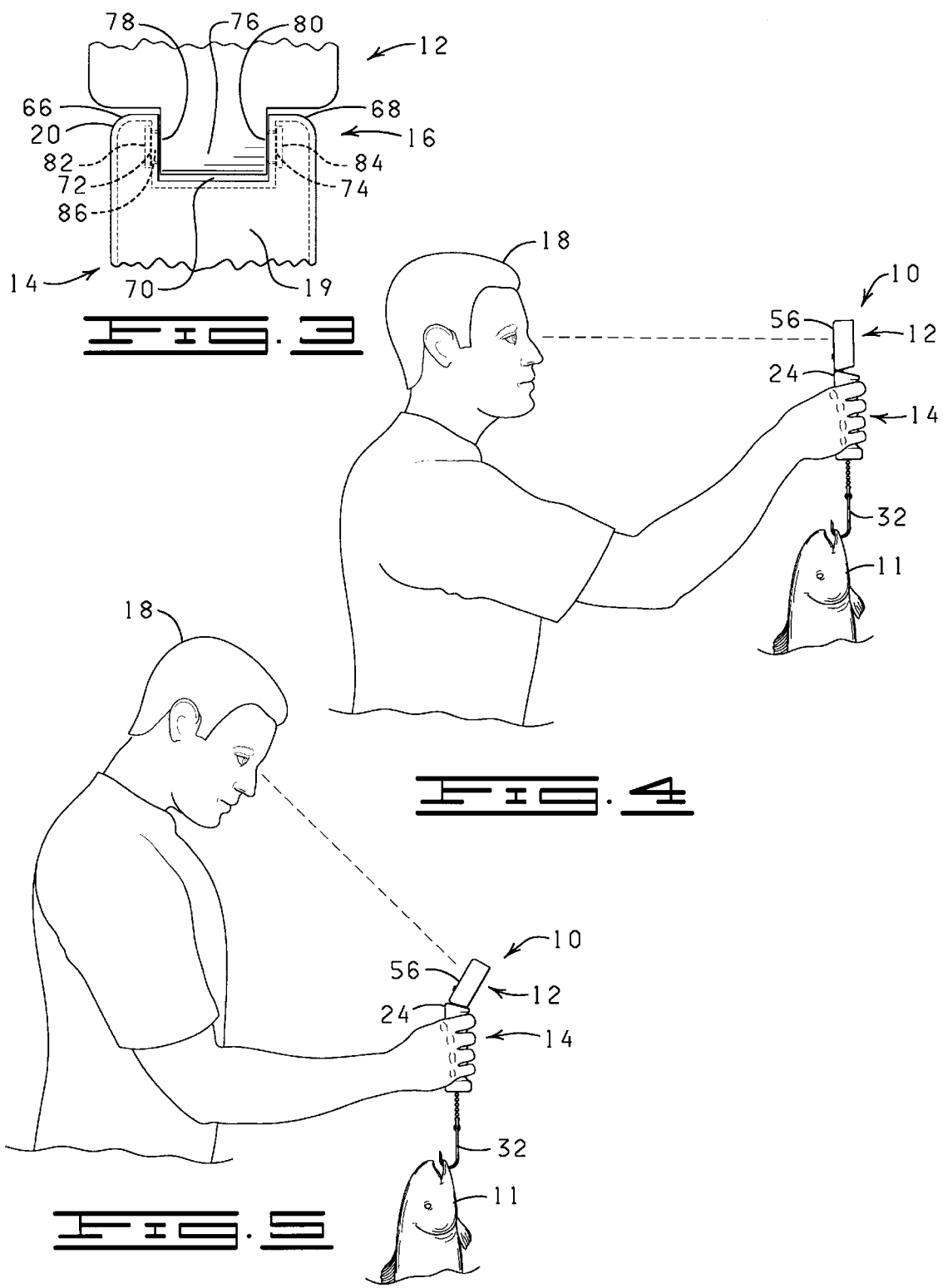

1

FISH SCALE HAVING A PIVOTAL DISPLAY ASSEMBLY

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Hand-held electronic scales for weighing objects, such as fish, are known in the art. These prior art electronic scales include a display assembly, which is non-pivotally connected to a handle assembly. A hook extends below the handle assembly for supporting an object, such as a fish, to be weighed. The weight of the object is displayed on the display assembly. Because of the limited viewing angle of the prior art display assembly, the scale must be maintained at a predetermined height, relative to the individual's eye-level when the individual is viewing the display assembly. This limited viewing angle can make weighing large objects difficult because it requires the individual to raise the scale and the attached large object to a predetermined height for viewing the display.

For this and other reasons, a need exists for an electronic scale for weighing objects, such as fish, which does not have to be maintained at a certain predetermined position relative to the individual's eye-level for viewing by the individual. It is to such an improved scale which the present invention is directed.

SUMMARY OF THE INVENTION

In one aspect, the present invention is directed to a hand-held fish scale having a pivotal display assembly for weighing objects such as fish. The scale includes a handle assembly which is dimensioned to be gripped by the hand of an individual. The scale has an upper end and a lower end. A force sensor is housed within the handle assembly. A support assembly having a support member connected to one end of a flexible linkage is provided for supporting the object. The flexible linkage is connected to the force sensor such that the flexible linkage transfers the weight of the object supported on the support member to the force sensor. In one aspect of the present invention, the flexible linkage extends from the lower end of the handle assembly such that the support member is supported below the handle assembly.

The handle assembly is pivotally connected to a display assembly such that the display assembly may be positioned at an optimum viewing angle relative to the eyes of the individual supporting the handle assembly. An electronic display is disposed within the display assembly such that the electronic display can be perceived by the individual. The electronic display is electrically connected to a micro-controller, which may be disposed within the display assembly if desired. The micro-controller is electrically connected to the force sensor for receiving signals from the force sensor, which are indicative of the weight of the object. In response thereto, the micro-controller generates a value representing the weight of the object. The display is adapted to exhibit a readout of the value received from the micro-controller, which may be an alphanumeric representation of the weight of the object.

In another aspect, the present invention is directed toward a method of using an electronic scale. The method includes the step of attaching a fish to be weighed on a support member suspended from a handle assembly of the electronic scale. The handle assembly of the scale is then gripped by the hand of an individual and lifted so as to support or suspend the fish, which is attached to the support member, to transfer the weight of the fish to a force sensor communicating with the support member. A display assembly, which is attached to the handle assembly, is then moved relative to the handle assembly to bring the display of an alphanumeric readout representing the weight of the fish within view of the individual.

Other features, and advantages of the present invention will be apparent to those skilled in the art from the following detailed description when read in conjunction with the accompanying drawings and appended claims.

BRIEF DESCRIPTION OF THE SEVERAL VIEWS OF THE DRAWING

FIG. 3 is a front elevational view of a hinge assembly of the electronic scale connecting the display assembly to the handle assembly.

FIG. 4 is a side elevational view of an individual holding the electronic scale depicted in FIGS. 1 and 2 wherein the display assembly of the electronic scale is moved to a first position to permit the individual to read the electronic display when the electronic display is positioned at the height of the individual's eyes.

FIG. 5 is a side elevational view of the individual holding the electronic scale, wherein the display assembly is moved to a second position wherein the electronic display can be read at a location below the individual's eyes.

DETAILED DESCRIPTION OF THE INVENTION

Figure 1:
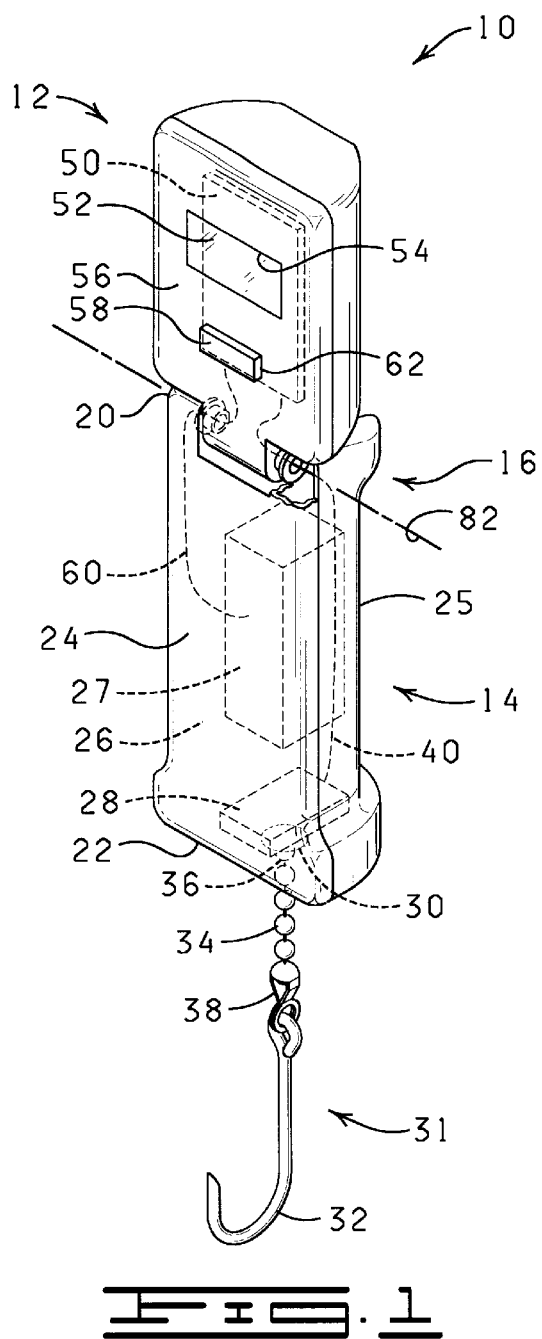
FIG. 1 is a perspective view of an electronic scale constructed in accordance with the present invention.
Figure 2:
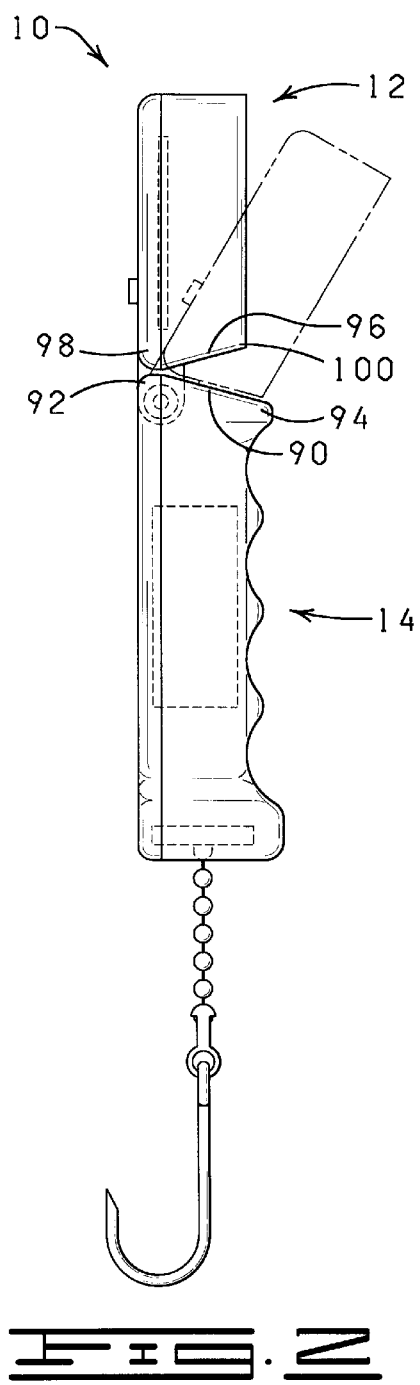
FIG. 2 is a side elevational view of the electronic scale depicted in FIG. 1, wherein the electronic scale includes a display assembly which is movably connected to a handle assembly.

Referring now to the drawings, and more particularly to FIGS. 1 and 2, shown therein is a scale 10 constructed in accordance with the present invention for weighing at least one object 11, such as a fish (as shown in FIGS. 4 and 5). The scale 10 includes a display assembly 12, a handle assembly 14, and a hinge assembly 16. The hinge assembly 16 movably connects the display assembly 12 to the handle assembly 14 such that the display assembly 12 can be moved relative to the handle assembly 14, to provide an angled focus for viewing by an individual 18 (as shown in FIGS. 4 and 5) to be described hereinafter. In one embodiment, the scale 10 can be a hand-held electronic fish scale.

The handle assembly 14 includes a housing 19 having an upper end 20 and a lower end 22. The housing 19 can be formed from a front piece 24 and a rear piece 25. The housing 19 of the handle assembly 14 is contoured to be gripped by the individual 18 so that the individual 18 can subsequently lift the scale 10 and the object 11 supported thereby. The housing 19 can be constructed of a sturdy yet lightweight material, such as a polymeric material. The rear piece 25 and front piece 24 are attached to form the grippable exterior portion of the housing 19 of the handle assembly 14 using known methods, such as a bonding material or screws.

The housing 19 encloses an interior space 26. The interior space 26 defines a first pocket which is sized and dimensioned to matingly receive a power supply housing 27 therein. The power supply housing 27 is adapted to retain a power supply (not shown) to provide electrical power for the scale 10. The interior space 26 defines a second pocket which is sized and dimensioned to matingly receive a force sensor 28 therein so that the force sensor 28 is supported by the housing 19 of the handle assembly 14. An opening 30 is provided through the lower end 22 of the housing 19 such that the opening 30 communicates with the second pocket defined by the interior space 26.

A support assembly 31 is provided for permitting the object 11 to be supported thereby during weighing of the object 11. The support assembly 31 includes a support member 32 connected to a flexible linkage 34. The flexible linkage 34 has a first end 36 and a second end 38. The flexible linkage 34 can be constructed of a rigid, yet flexible, material such as metal chain. The first end 36 of the flexible linkage 34 is disposed through the opening 30 formed through the lower end 22 of the handle assembly 14, and is connected to the force sensor 28. The second end 38 of the flexible linkage 34 is connected to the support member 32. The support member 32 can be provided with a hook shape, and can also be constructed from a rigid material, such as metal. Thus, it can be seen that the force sensor 28 supports the support assembly 31 such that the weight of the object which is being supported by the support member 32 is translated into a force applied to the force sensor 28.

The force sensor 28 outputs electronic signals indicative of the weight being supported by the support assembly 31 over a first signal path 40 extending between the force sensor 28 and a micro-controller 50, which can be located in the display assembly 12, as shown in FIG. 1. The micro-controller 50 is capable of receiving signals representing the weight of the object from the force sensor 28 and generating values indicative of the weight of the object 11 for communication to an electronic display 52. The micro-controller 50 and the electronic display 52 can be a conventional electronic display and micro-controller.

The electronic display 52 is at least partially contained within a first opening 54 formed in a front facing 56 of the display assembly 12 such that the electronic display 52 is perceivable by the individual 18. The electronic display 52 is electrically connected to the micro-controller 50 such that the electronic display 52 is capable of receiving signals from the micro-controller 50 and displaying an alphanumeric readout representing the weight of the object 11.

To selectively actuate and deactuate the scale 10, the display assembly 12 includes a power switch 58 which initiates and terminates power from the power supply retained within the power supply housing 27 through a second signal path 60. The second signal path 60 extends from the interior space 26 of the handle assembly 14 through the hinge assembly 16 into the display assembly 12. The power switch 58 is disposed through a second opening 62 in the front facing 56 of the display assembly 12 to be accessible to the individual 18.

Referring now to FIG. 3, the hinge assembly 16 will be described hereinafter. The hinge assembly 16 includes a first flange 66 and a second flange 68 extending upwardly in close proximity to the upper end 20 of the handle assembly 14. The first and second flanges 66 and 68 are spatially disposed to form a void 70 therebetween. A first flange opening 72 and a second flange opening 74 are formed in respective first and second flanges 66 and 68 such that the first and second flange openings 72 and 74 communicate with the void 70.

A hinge member 76 having a first side 78 and a second side 80 projects from the lower end of the display assembly 12 and is disposed in the void 70. A first pin member 82 projects from the first side 78 of the hinge member 76 so as to pass through the first flange opening 72. A second pin member 84 projects from the second side 80 of the hinge member 76 so as to pass through the second flange opening 74.

Thus, the first pin member 82 disposed through the first flange opening 72 and the second pin member 84 disposed through the second flange opening 74 are constructed to maintain the display assembly 12 movably connected to the handle assembly 14. The hinge assembly 16 allows for limited movability along an axis of rotation 85 of the display assembly 12 relative to the handle assembly 14 so as to provide an angled focus for the individual 18 to overcome the limited viewing angle of the prior art electronic display.

A stop pin 86 (not shown in detail) projects from the first pin member 82. The stop pin 86 is positioned to contact the interior of the housing 19 when the display assembly 12 is movably rotated to a forward-most upright position relative to the handle assembly 14. The stop pin 86 contacts the interior of the housing 19 to limit the rotation of the display assembly 12 beyond a forward-most upright position relative to the handle assembly 14.

The housing 19 of the handle assembly 14 defines an angled upper shoulder portion 90 such that a front shoulder portion 92 is raised above a rear shoulder portion 94. An angled lower shoulder portion 96 is defined by the display assembly 12 such that a front shoulder portion 98 is disposed lower than a rear shoulder portion 100. Thus, it can be seen that the inverse angled relationship of the angled upper shoulder portion 90 of the handle assembly 14 and the angled lower shoulder portion 96 of the display assembly 12 matingly come into contact when the display assembly 12 is tilted relative to the handle assembly 14. In other words, the angled upper shoulder portion 90 of the handle assembly 14 becomes a support platform upon which the angled lower shoulder portion 96 of the display assembly 12 is supported when the display assembly 12 is disposed in its most acutely pivoted position relative to the handle assembly.

Referring now to FIGS. 4 and 5, the movement of the display assembly 12 relative to the handle assembly 14 is described. The display assembly 12 is pivotally connected to the handle assembly 14 so as to permit movement of the display assembly 12 relative to the handle assembly 14 between a first position and a second position. In the first position, as shown in FIG. 4, the display assembly 12 is disposed in an upright position such that the front facing 56 of the display assembly 12 is aligned with the front piece 24 of the handle assembly 14. In the first position, the electronic display 52 can be read when the electronic display 52 is generally disposed at a same height as the individual's eyes.

In the second position, as shown in FIG. 5, the display assembly 12 is disposed such that the front facing 56 of the display assembly 12 is at an obtuse angle relative to the front piece 24 of the handle assembly 14. The positioning of the display assembly 12 relative to the handle assembly 14 allows the electronic display 52 to be read from an optimum location generally below the eyes of the individual 18. Thus, the shortcomings of the limited viewing angle of the prior art scales is overcome with the pivotability of the display assembly 12 relative to the handle assembly 14 of the present invention.

In use, the individual 18 attaches the object 11 to the support member 32. The individual 18 lifts the scale 10 and the object 11 attached thereto to support the fish whereby force is applied to the force sensor 28 and the electronic display 52 is disposed at an angle relative to the height of the individual's eyes. The micro-controller 50 receives the signals output by the force sensor 28 and translates these force signals into a signal indicative of the weight of the object 11. The signal indicative of the weight of the object 11 is generated by the micro-controller 50 and output to the electronic display 52 connected thereto, so that such signal is displayed as an alphanumeric readout which is visually perceivable by the individual 18. The display assembly 12 can then be pivoted relative to the handle assembly 14 to an optimum viewing angle such that the electronic display 52 is in view of the individual's eyes.

Changes may be made in the embodiments of the invention described herein, or in the parts or the elements of the embodiments described herein or in the steps or sequence of steps of the methods described herein without departing from the spirit or the scope of the invention as defined in the following claims.

What is claimed is:

1. A hand-held electronic fish scale for weighing a fish, comprising:

a handle assembly having an upper end, a lower end, and at least a portion dimensioned to be gripped by the hand of an individual;

a force sensor supported by the handle assembly, the force sensor being capable of outputting a signal indicative of the weight of the fish;

a support assembly adapted to support the fish, the support assembly communicating with the force sensor so as to transfer the weight of the fish to the force sensor; and a display assembly movably connected to the handle assembly such that the display assembly may be set at an optimum viewing angle relative to the eyes of an individual supporting the handle assembly.

2. The device of claim 1 wherein the display assembly includes an electronic display; and a micro-controller electrically connected to the electronic display such that the electronic display is capable of receiving signals from the micro-controller and displaying an alphanumeric readout representing the weight of the fish.

3. The device of claim 1 wherein the handle assembly includes a housing having an angled upper shoulder portion, and wherein the display assembly has an angled lower shoulder portion, the angled upper shoulder portion of the handle assembly and the angled lower shoulder portion of the display assembly being adapted to matingly come into contact when the display assembly is tilted relative to the handle assembly such that the angled upper shoulder portion of the handle assembly becomes a support platform upon which the angled lower shoulder portion of the display assembly can be supported.

4. The device of claim 1 further comprising a hinge assembly connecting the display assembly to the handle assembly.

5. The device of claim 4 wherein the hinge assembly includes:

a first flange disposed on the handle assembly;

a second flange disposed on the handle assembly, the first and second flanges being spatially disposed so as to create a void therebetween; and a hinge member projecting from the display assembly, the hinge member being disposed in the void and movably attached therein.

6. A method of electronically weighing and displaying the weight of a fish comprising:

a) attaching the fish to a support member of a scale, the support member communicating with a force sensor supported by the scale;

b) lifting a handle assembly of the scale and the fish attached thereto to support the fish whereby force is applied to the force sensor and an electronic display of the scale is disposed at an angle relative to the individual's eyes;

c) displaying an alphanumeric readout, via a display assembly in a format perceivable by the individual, the alphanumeric readout being indicative of the force applied to the force sensor; and d) moving the display assembly relative to the handle assembly, wherein the display assembly is moveably connected to the handle assembly, to an optimum viewing angle such that the electronic display is in view of the individual's eyes.

7. The method of claim 6 wherein step (b) is defined further as lifting the scale with the fish attached thereto to a position substantially below the individual's eye-level; and wherein step (d) is defined further as pivoting the electronic display such that alphanumeric readout is visually perceivable when the scale is maintained at a level substantially below the individual's eye-level.

* * * * *